United States Patent [19]

Bateman

[11] 4,412,635
[45] Nov. 1, 1983

[54] TRAILER HITCH-MOUNTED UTILITY CARRIER FOR VEHICLES

[76] Inventor: Franklin B. Bateman, 3040 Table Rock Rd., Medford, Oreg. 97501

[21] Appl. No.: 407,575

[22] Filed: Aug. 12, 1982

[51] Int. Cl.³ .............................................. B60R 9/06
[52] U.S. Cl. ...................... 224/42.03 R; 224/42.03 A; 224/42.07; 414/462; 403/115; 403/122
[58] Field of Search ................ 224/42.03 R, 42.03 A, 224/42.07, 42.42, 331; 403/115, 122

[56] References Cited

U.S. PATENT DOCUMENTS

| | | | |
|---|---|---|---|
| 3,606,385 | 9/1971 | Johannes | 280/422 |
| 3,650,443 | 3/1972 | Haskett et al. | 224/42.07 X |
| 3,724,694 | 4/1973 | Wilson | 224/42.07 X |
| 3,796,333 | 3/1974 | Goldstein | 214/450 |
| 3,805,984 | 4/1974 | Schwarz et al. | 214/450 |
| 3,853,255 | 12/1974 | Spencer | 224/42.03 B |
| 3,858,775 | 1/1975 | Hass | 224/42.03 B |
| 3,976,213 | 8/1976 | Ball | 214/450 |
| 4,138,152 | 2/1979 | Prue | 224/42.03 A X |

Primary Examiner—Steven M. Pollard
Attorney, Agent, or Firm—Klarquist, Sparkman, Campbell, Leigh & Whinston

[57] ABSTRACT

A trailer hitch-mounted utility carrier for vehicles includes a carrier member having an upper wall to which vehicle accessories can be attached and a lower wall which is slotted to receive a "ball" type trailer hitch. In one embodiment, a clamping member pivotally connected to the carrier member is pivotable from a non-clamping position in which the carrier can be removed from the hitch to a clamping position in which the clamping member engages the ball to force a lower portion of the carrier into a clamped position between the ball and an underlying carrier support surface. In a second embodiment, turnbuckles exert a force between rear portions of the carrier member and underlying support to clamp a forward portion of the carrier into a clamped position between the ball and another portion of the support.

12 Claims, 6 Drawing Figures

U.S. Patent     Nov. 1, 1983     4,412,635
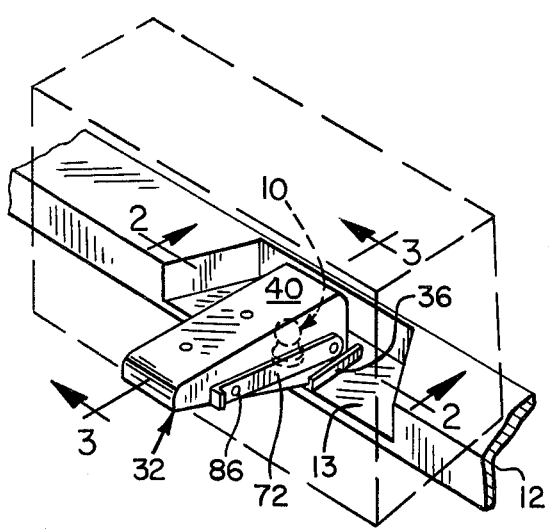
FIG. 1
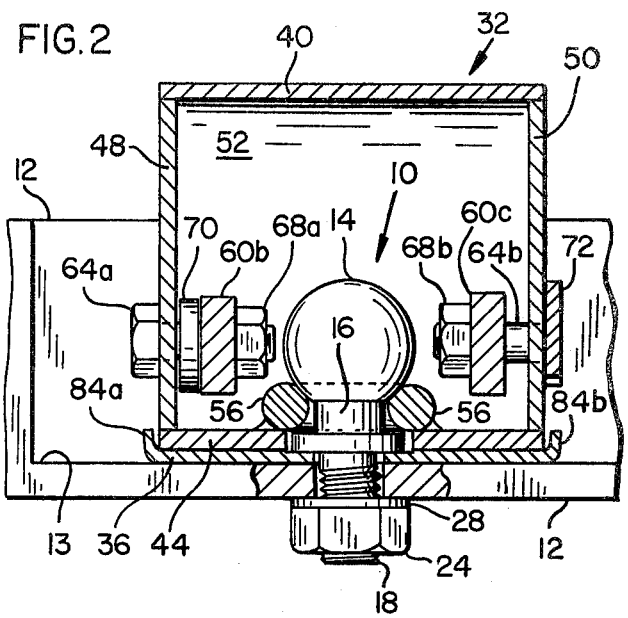
FIG. 2
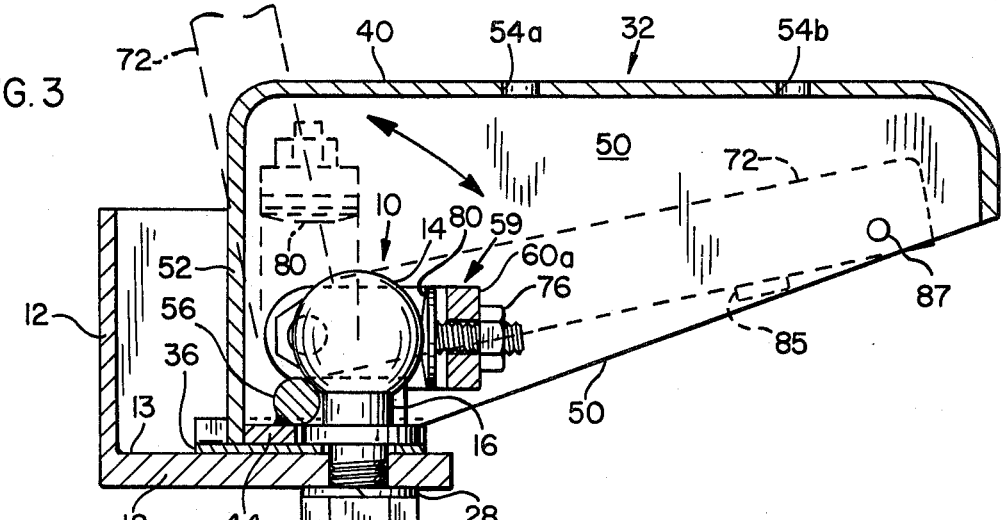
FIG. 3
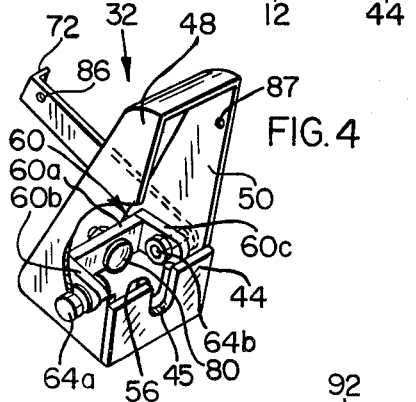
FIG. 4
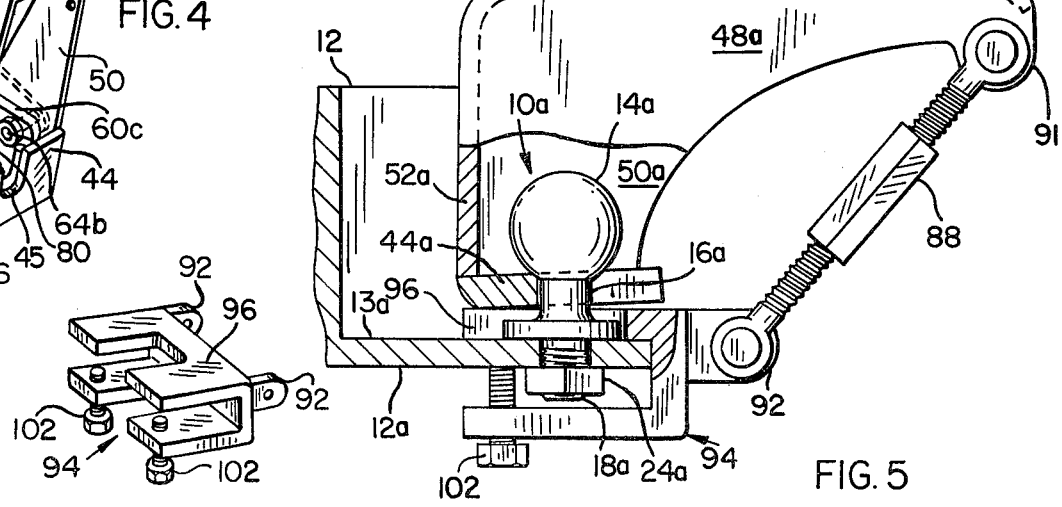
FIG. 6
FIG. 5

TRAILER HITCH-MOUNTED UTILITY CARRIER FOR VEHICLES

BACKGROUND OF THE INVENTION

1. Field of the Invention

This invention relates generally to vehicle-mounted utility carriers and more particularly to vehicle-mounted utility carriers mountable to ball-type trailer hitches.

2. Description of the Prior Art

A utility carrier mounted to the rear of a vehicle can be very useful for transporting vehicle accessories such as a ski rack, utility box, bicycle rack or the like, particularly if the carrier (1) is adapted to be mounted to a ball-type trailer hitch capable of other uses as well and (2) can be mounted and detached quickly and easily without the use of tools.

Many prior utility carriers, such as those shown in Prue U.S. Pat. No. 4,138,152; Spencer U.S. Pat. No. 3,853,255 and Johannes U.S. Pat. No. 3,606,385, are not adapted to be mounted to ball-type trailer hitches and thus require the use of specialized hitches to which the carrier is attached. Such carriers also require the use of tools to mount and detach the carrier. Consequently, the carriers either must be mounted semi-permanently to the vehicle or periodically mounted to and detached from the vehicle with great effort.

Other prior utility carriers, such as those shown in Haas U.S. Pat. No. 3,858,775 and Haskett, et al. U.S. Pat. No. 3,650,443, are adapted to be mounted to ball-type trailer hitches, but such carriers still require the use of tools for complete mounting and detaching of the carrier. Consequently, such carriers cannot be mounted to and detached from the vehicle quickly and easily, an important feature if the trailer hitch or rear end of the vehicle is to be used for other purposes.

A few prior utility carrier constructions, such as those shown in Schwartz, et al. U.S. Pat. No. 3,805,984; Goldstein U.S. Pat. No. 3,796,333 and Wilson U.S. Pat. No. 3,724,694, are adapted to be mounted to ball-type trailer hitches without the use of tools. However, such carriers tend to be of a rather complex construction and still cannot be mounted to and detached from the vehicle quickly and easily. For example, the carrier shown in Wilson has two support arms which are secured to the underframe of the vehicle. One must crawl under the vehicle to tighten or loosen the thumbscrews securing the arms to the underframe, depending upon whether the carrier is being mounted to or detached from the vehicle. The carrier shown in Goldstein is designed so that a tongue of the trailer hitch must be precisely aligned with a pair of complementary-shaped opposing channels within which the tongue is slidably received, a difficult task for a single person if the carrier is of a heavy, sturdy metal construction. As for the carrier shown in Schwartz, et al., it has several parts which must be assembled before the carrier is mounted to the trailer hitch.

The above "ball" hitch-mounted carriers have an additional disadvantage. They do not make adequate use of the main component of the trailer hitch—the hitch ball. They use the hitch ball only as a support to carry all or a portion of the weight of the carrier and as part of a locking mechanism to prevent complete disengagement of the carrier from the hitch, but not in a manner which eliminates all pivoting and sliding movement of the carrier relative to the hitch. Consequently, the load which the carrier is able to support is inherently limited and the amount of wear to which many parts of the carrier are subject as a result of the movement is substantial.

Of general interest is the boat loader shown in Ball U.S. Pat. No. 3,976,213.

Accordingly, there is a need for a utility carrier of simplified construction which is adapted to be mounted to a ball-type trailer hitch without the use of tools and which is mountable to the hitch in a manner such that all movement of the carrier relative to the hitch is positively prevented.

SUMMARY OF THE INVENTION

The present invention fulfills the foregoing needs by providing a carrier member having an upper wall for attaching and supporting a load and a slotted lower wall for receiving a a hitch ball of a vehicle-supported trailer hitch. An adjustable force-applying means cooperates with the carrier member to apply a clamping force to clamp a portion of the carrier member between the hitch ball and an underlying support surface. In one form of the invention, the force-applying means may comprise a clamping means carried by the carrier member which exerts a force against one portion of the hitch ball to urge such portion of the carrier member against an opposing portion of the hitch ball and the support surface. The clamping means may be pivoted to the carrier member for movement about a pivot axis offset from a parallel center axis of the ball and operated by a handle to selectively engage the ball. In a second form of the invention, the force-applying means may apply a force to one portion of the underlying support to urge a portion of the carrier member into clamping engagement with the ball and another portion of the underlying support. The force-applying means may comprise an extensible means such as a turnbuckle to exert a force between the carrier member and the support.

It is therefore one object of the invention to provide a utility carrier of simplified construction adapted to be mounted to a vehicle-supported, ball-type trailer hitch.

Another object of the invention is to provide a utility carrier that can be quickly and easily mounted to and detached from a trailer hitch.

An additional object of the invention is to provide a utility carrier that can be mounted to and detached from a trailer hitch without the use of tools.

Yet another object is to provide a utility carrier mountable to a ball-type trailer hitch in a way such that all movement of the carrier relative to the trailer hitch is positively prevented and a fixed, stable support for the carrier provided.

A more specific object is to provide a utility carrier mounting system that firmly mounts the carrier to a ball-type trailer hitch by forcing a portion of the carrier into a clamped position between the hitch ball and an underlying support.

Other objects and advantages of the invention will become apparent from the following detailed description and with reference to the accompanying drawings.

BRIEF DESCRIPTION OF THE DRAWINGS

In the drawings:

FIG. 1 is a perspective view of a utility carrier mounted to a rear bumper of a vehicle in accordance with one embodiment of the invention and showing in dashed lines a utility box or the like supported by the carrier.

FIG. 2 is a vertical sectional view taken along line 2—2 of FIG. 1.

FIG. 3 is a vertical sectional view taken along line 3—3 of FIG. 1.

FIG. 4 is a perspective view of the carrier of FIG. 1 as viewed toward the bottom and one side thereof;

FIG. 5 is a partly sectional side view of a utility carrier in accordance with a second embodiment of the invention, the carrier being mounted to a rear bumper of a vehicle.

FIG. 6 is a perspective view of a bracket member shown in FIG. 5 in reduced scale.

DETAILED DESCRIPTION OF A PREFERRED EMBODIMENT

The present invention is a utility carrier which mounts on the trailer hitch of, for example, a pickup truck to provide a mounting base for mounting vehicle accessories such as a utility box, motorcycle or bicycle rack, winch, hoist, or the like.

Embodiment of FIGS. 1-4

Referring to FIG. 1, the present invention is adapted to be mounted on a ball-type trailer hitch 10 secured to a rear bumper 12 of a vehicle or alternatively to a hitch tongue (not shown) suported by the underframe of the vehicle. The bumper 12 provides an underlying support including a supporting surface 13 for the carrier. As shown in FIGS. 2 and 3, the trailer hitch 10 typically includes a hitch ball 14 having a neck portion 16 and threaded shank 18, as well as the underlying support. Shank 18 receives a nut 24 and washer 28 for removably securing the hitch to the bumper.

The utility carrier includes a carrier member 32 and an adjustable force-appplying means cooperable with the carrier member for selectively applying a clamping force to clamp a portion of the carrier member between the hitch ball 14 and underlying support member 12 to secure the carrier member to the vehicle. The carrier member is supported on a base plate 36 rigidly secured to upper surface 13 of bumper 12 so as to become part of the underlying support. Plate 36 has upturned side edge portions 84a, 84b as means to restrain the carrier member against rotation on the underlying support.

The carrier member includes an upper wall 40, lower wall 44, opposing sidewalls 48 and 50 (FIG. 2) and a forward wall 52 (FIG. 3) which together form a rigid, housing surrounding the trailer hitch and extending rearwardly beyond bumper 12. The upper wall 40 provides a broad flat platform for mounting vehicle accessories. Holes 54a and 54b (FIG. 3) can be used for this purpose. As shown most clearly in FIG. 4, lower wall 44 includes an open-ended slot 45 to receive the neck portion of the trailer hitch. A collar 56 welded to the upper surface of lower wall 44 borders slot 45 to provide an enlarged lower wall portion for engaging the ball. The force-applying means 59 comprises a clamping assembly pivoted to the opposite sidewalls of the carrier housing. Such assembly includes a clamping member 80 threaded through a crossbar 60a of a yoke 60 and secured by a nut 76. Yoke 60 has sidearm portions 60b, 60c extending forwardly within the housing and pivotally attached to the opposite sidewalls by threaded fasteners 64a, 64b, and nuts 68a, 68b. A washer 70 provides a spacer between yoke arm 60b and sidewall 48.

Fastener 64b is connected to an operating handle 72 along the outside of wall 50 to provide a clamp operating means for pivoting the clamp member 80 into and out of engagement with hitch ball 14. For this purpose, the pivot axis of yoke 60 is positioned forwardly of the center of ball 14 as shown in FIG. 3.

An ear 85 (FIG. 3) secured to sidewall 50 is provided as a stop for handle 72. The handle 72 can be locked against the ear 85 and theft of the carrier member prevented through use of a lock and a cable or chain passing through aligned apertures 86, 87 in the handle and sidewall 50, respectively.

To clamp the carrier to the trailer hitch, slotted lower wall 44 of the carrier is placed on the underlying bumper support 12 with the neck portion of ball 14 within carrier slot 45. Handle 72 should initially be in its upper dashed-line position shown in FIG. 3. Then the handle is pivoted downwardly, pivoting the yoke 60 from a vertical position to a horizontal position, until the head of clamping member 80 firmly engages a rear surface of hitch ball 14. Such engagement draws collar portion 56 of lower wall 44 against an opposing forward portion of the hitch ball adjacent neck 16, thus wedging or clamping lower wall 44 firmly between the hitch ball and the underlying support 12 to effectively secure the carrier to the vehicle. The amount of clamping force generated by clamping member 80 and its point of application on the ball can be adjusted through threaded adjustment of member 80 in yoke crossarm 60a, and also to some extent by the amount of downward force applied to handle 72. Of course, the thickness of lower wall 44 must be sufficient to enable both the ball and underlying support surface to generate clamping forces against the lower wall when clamping member 80 engages the rear of the ball.

Embodiment of FIGS. 5-6

A second embodiment of the invention will now be described with reference to FIGS. 5 and 6. In this embodiment, a carrier member 32a defines a housing similar to that of the previous embodiment, including a top wall 40a, slotted bottom wall 44a, front wall 52a, and opposite sidewalls 48a, 50a. Top wall 40a includes angle members 104a, 104b defining a guideway for slidable attachment of accessories.

A conventional trailer hitch 10a includes a hitch ball 14a having a neck portion 16a and threaded shank 18a extending through a vehicle bumper 12a to secure the hitch to the vehicle with nut 24a. As before, bumper 12a provides an underlying support for the carrier, including a support surface 13a. However, in this embodiment the support is supplemented by a yoke-like bracket 94 which slips over the end of the bumper and about the neck of the ball. It is secured to the bumper by clamping screws 102 to become a part of the underlying support for the carrier.

Carrier member 32a includes a rearward extension of the top and sidewalls, including ears 91 on the sidewalls which mount one set of ends of a pair of turnbuckles 88. The other set of turnbuckle ends are fastened to a pair of ears 92 on support bracket 94.

The turnbuckles serve as a force-applying means to apply a force between the carrier and the bracket portion of the underlying support. This force, directed upwardly and rearwardly against the carrier, in turn draws the lower wall portion of the carrier member upwardly against an underportion of ball 14a and downwardly against an underlying support portion 96 of bracket 94 to clamp the lower wall firmly between the ball and the underlying support. The amount of tension in the turnbuckles determines the amount of clamping force generated. The rearward extension of the carrier housing provides leverage to multiply the clamping force. The carrier assembly can be quickly and easily removed from the vehicle by slackening the turnbuckles and loosening screws 102.

Having illustrated and described the principles of my invention by what is presently a preferred embodiment and one alternative, it should be apparent to those persons skilled in the art that such embodiments may be modified in arrangement and detail without departing from such principles. I claim as my invention all such modifications as come within the true spirit and scope of the invention as defined by the following claims.

I claim:

1. A utility carrier for attachment to a trailer hitch of a vehicle in which the hitch includes a hitch ball and an underlying support for the carrier, said carrier comprising:
   a carrier member including an upper wall for attaching and supporting a load, and a slotted lower wall for receiving a neck portion of the hitch ball; and
   force-applying means cooperable with said carrier member for selectively applying a clamping force to clamp a portion of said carrier member between said ball and said underlying support to secure said carrier member to the vehicle.

2. An apparatus according to claim 1 wherein said force-applying means includes a clamping member pivoted to said carrier member for selectively applying a clamping force against one portion of said ball to force said portion of said carrier member against an opposing portion of said ball.

3. An apparatus according to claim 1 wherein said force-applying means includes a clamping means operable to apply a clamping force against one portion of said hitch ball to draw said slotted lower wall against an opposing portion of said ball and thereby clamp said lower wall between said ball and said underlying support.

4. An apparatus according to claim 2 wherein said clamping member is pivoted to said carrier member for pivoting movement about an axis offset on one side of the center of said hitch ball and is operable upon movement about said axis to engage a portion of said ball on the opposite side of said center.

5. An apparatus according to claim 1 including anti-rotation means cooperative with said carrier member for restraining said carrier member against rotation on said underlying support about said ball.

6. An apparatus according to claim 2 including clamp operating means connected to said clamping member for pivoting said clamping means from a nonclamping position in which said lower wall is free to move relative to said hitch ball to a clamping position.

7. An apparatus according to claim 2 wherein said clamping member includes a force adjustment means for varying the magnitude of the clamping force applied to said carrier member.

8. An apparatus according claim 4 wherein said force-applying means includes a yoke member mounting said clamping member and pivoting said clamping member to said carrier member.

9. An apparatus according to claim 1 wherein said force-applying means includes extensible means operable to exert a force between said carrier member and said underlying support.

10. An apparatus according to claim 1 wherein said force-applying means includes means for applying a force between a first portion of said carrier member and one portion of the hitch to clamp a second portion of said carrier member in compression between said hitch ball and another portion of said hitch.

11. An apparatus according to claim 10 wherein said force-applying means applies said force to said hitch ball.

12. An apparatus according to claim 10 wherein said force-applying means applies said force to said underlying support.

* * * * *